Figure 1:
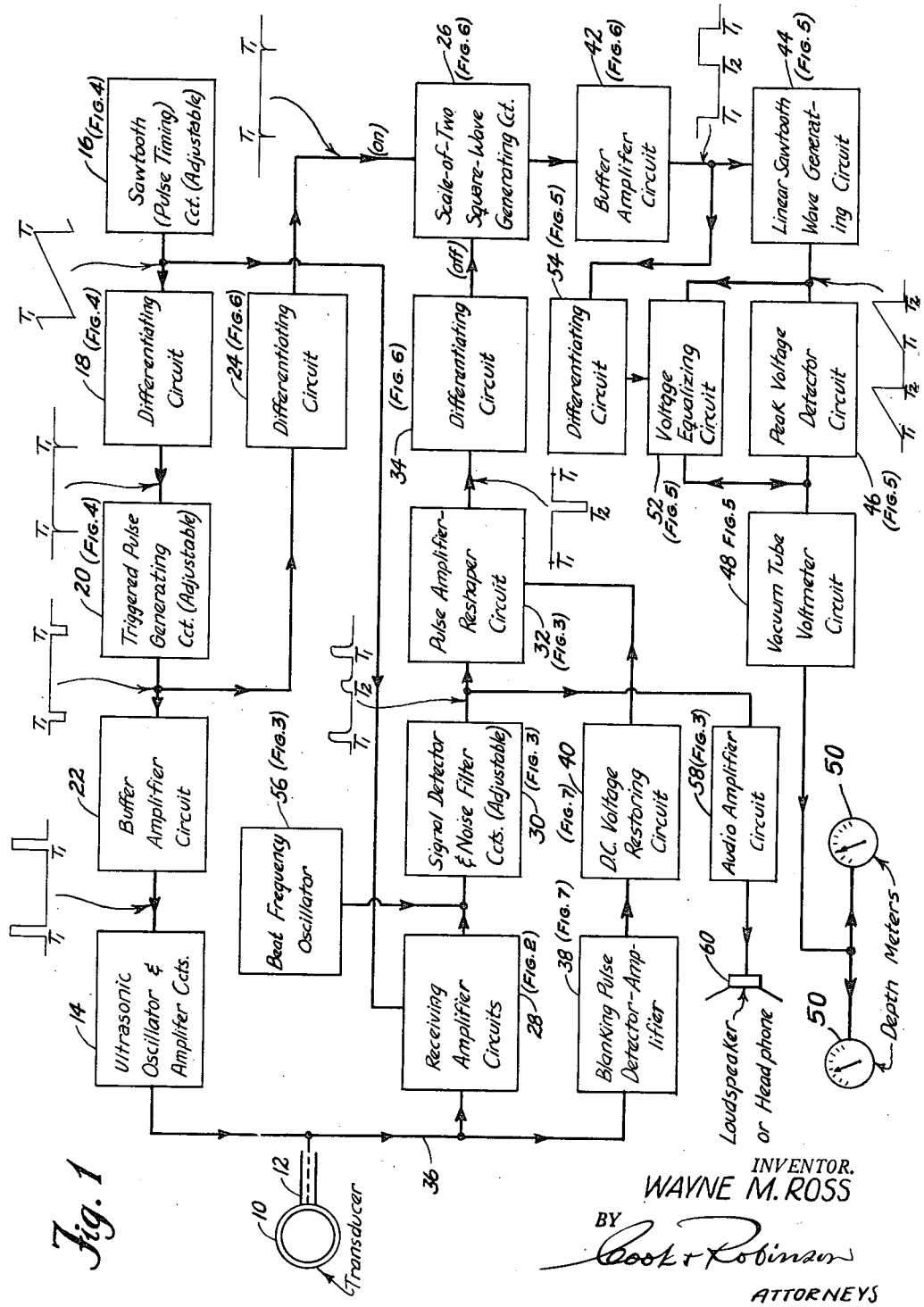

June 10, 1952  W. M. ROSS  2,599,586
MARINE DEPTH FINDER
Filed Aug. 3, 1948  4 Sheets-Sheet 1

INVENTOR.
WAYNE M. ROSS
BY
Cook + Robinson
ATTORNEYS

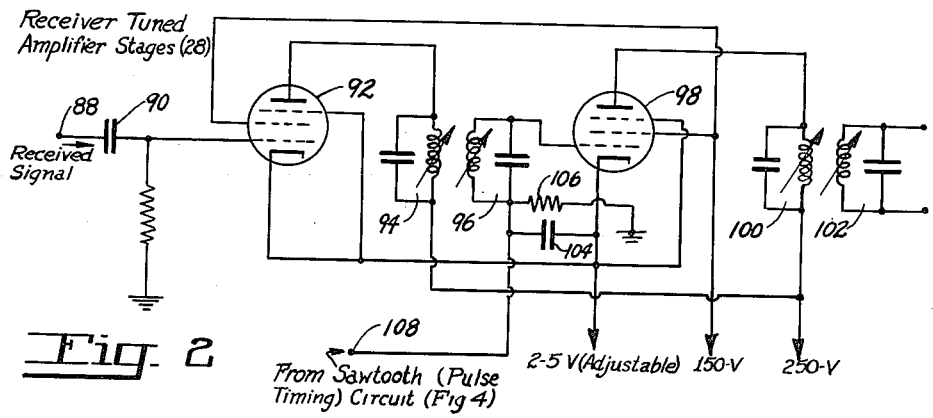
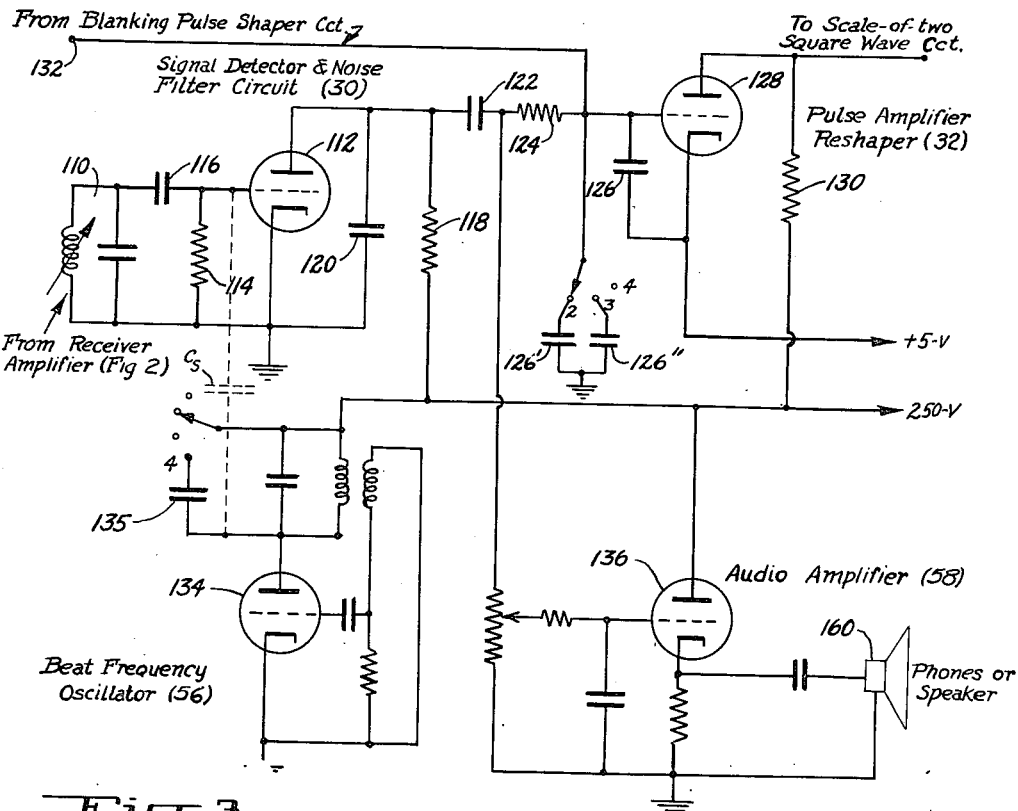

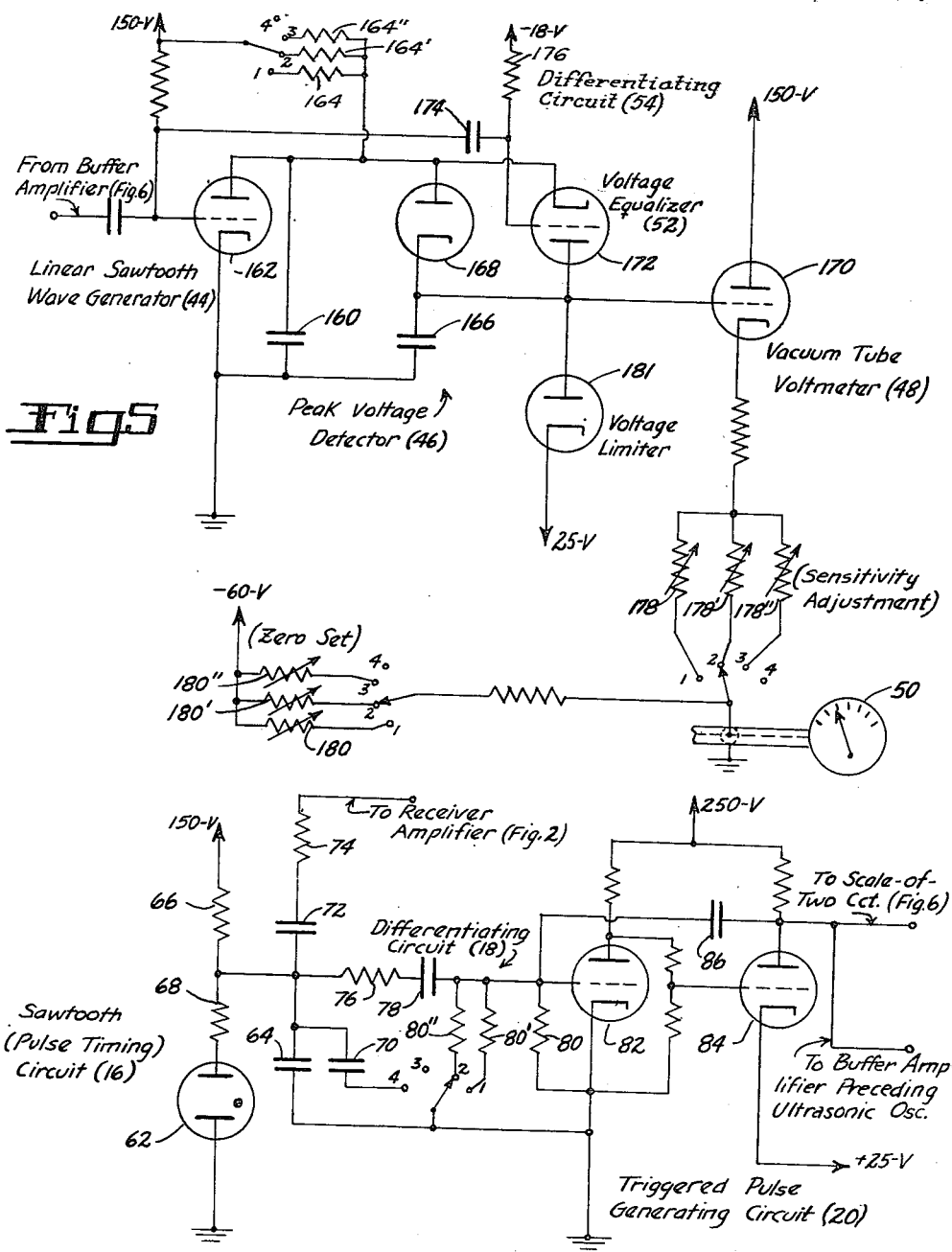

June 10, 1952 W. M. ROSS 2,599,586
MARINE DEPTH FINDER
Filed Aug. 3, 1948 4 Sheets-Sheet 4

INVENTOR.
WAYNE M. ROSS
BY
Cook & Robinson
ATTORNEYS

Patented June 10, 1952

2,599,586

UNITED STATES PATENT OFFICE 2,599,586

MARINE DEPTH FINDER

Wayne M. Ross, Seattle, Wash., assignor to Minneapolis-Honeywell Regulator Company, Minneapolis, Minn., a corporation of Delaware Application August 3, 1948, Serial No. 42,239

7 Claims. (Cl. 175—381)

This invention relates to marine depth finders, and more particularly to those of the ultrasonic type, electronically controlled and operated. With this kind of device ocean depth beneath a vessel is quickly and accurately determined by directing recurring ultrasonic energy pulses from the vessel toward the ocean bottom, receiving the corresponding echo pulses, and continuously or intermittently measuring the lapsed time interval between the related transmitted and received pulses. By relating such time interval to the velocity of sound in water, depth may be directly indicated on a meter, in feet or fathoms. Apparatus of this general type is highly useful in navigation, in charting depths of navigable waters, and in other more specialized applications, many of which are well known.

My present invention primarily concerns improved electronic circuits and circuit combinations which practically simplify and lower the cost of such depth finders, in addition to increasing their accuracy and extending their general utility. However, it is to be understood that certain features of the invention are not restricted to depth finders but may be used elsewhere, as will appear. Certain features of the system and apparatus herein disclosed constitute the respective subjects of the following divisional patent applications: Serial No. 271,961 filed February 16, 1952, for Detecting System; Serial No. 271,962 filed February 16, 1952, for Receiver Blanking Circuit for Pulse Transmission Reception System; Serial No. 271,963 filed February 16, 1952, for Pulse Timing and Receiver Automatic Gain Control in Pulse Object-Locating Systems.

An object of the invention of instant concern is to devise a depth finder system providing a continuous, accurate and automatically derived circuit response related to ocean depth and readable on one or more galvanometers or other indicators which may be located at any selected positions on the vessel. An important related object is to provide special lapsed time determining circuit means capable of responding immediately and sensitively to the slightest of variations in lapsed time, as occasioned by variations in ocean depth, no matter in what sense they may occur. Because the apparatus may often be used by those not specially trained in electronics, it is further desirable to avoid the necessity of critical apparatus adjustments to obtain proper circuit operation, and to simplify calibration of the device and its adjustment for different operating ranges.

Further objects, and the various features of the invention, will become evident from the description which follows and the accompanying drawings illustrating the preferred form of my invention as applied to marine depth finding apparatus. In reading this description it should be kept in mind that various modifications or substitutions may be made in the circuits or parts thereof without altering the principles involved, and that various of the disclosed features which perform useful circuit functions of a general character if regarded separately are applicable to devices other than marine depth finders.

Figure 1 is a block diagram of my improved marine depth finder apparatus, diagrammatically illustrating the principal component electronic circuits utilized and their functional interconnections.

Figures 2 through 7 are schematic circuit diagrams of certain preferred component circuits of the system, those not illustrated being entirely conventional or understood in the present state of the art. Throughout these figures, for ease of associating together the different detached figures, the individual circuit sections have been labeled and their effective input and output terminals identified by reference to the other circuits to which they are connected and which are shown elsewhere.

By way of further introduction, it is conventional to generate the beam of ultrasonic energy by an oscillator-energized Rochelle salt or quartz crystal transducer installed at the bottom of the vessel and directed toward the ocean's bottom. The pulsed oscillator usually operates in the frequency between 15,000 and in this case 60,000 cycles per second and the pulse repetition rate is made sufficiently low that the received echo pulses are returned to the transducer for electrical detection in the pulse intervals immediately following their corresponding transmitted pulses. Since the velocity of ultrasonic energy in sea water is approximately 4,825 feet per second, a pulse repetition rate of 100 cycles per minute is satisfactory for depths to 200 fathoms. At greater depths this rate is decreased. The pulse repetition rate is preferably maintained constant during a given operating condition.

As will be explained, I prefer to pulse the transducer at a pulse repetition rate of 100 cycles per minute when operating at ocean depths less than 200 fathoms, and to decrease this rate to approximately 50 cycles per minute when the apparatus is set for audible output. In this alternative setting of the controls the apparatus is set for listening, and a tonal characteristic is then imparted to the signal, as mentioned. At the reduced repetition rate it is possible to detect signals to a depth of 400 fathoms or thereabouts, and to listen for the time interval between transmitted and received pulses to estimate lapsed time from which depth may be estimated, or circuit means may then also be employed to take an actual measure of such interval if greater precision is desired. As will be evident, the operating ranges chosen are subject to variation and individual choice.

In the block diagram of Figure 1 the preferred form of my depth finder system is illustrated in a manner intended to facilitate description and understanding of the invention and is not intended to be entirely comprehensive in respect to detail. It will therefore be realized that the various blocks represent primary functional components, and that, for the sake of simplicity, the diagram omits certain less important or understood parts or circuits. Likewise, it will be understood that the names given the various circuit sections are not always the most general that could be employed to cover possible alternative devices which could be used. The portion of this description which immediately follows is devoted to a functional description of the system by reference to Figure 1. Later, the description takes up details of the circuits.

In the figure, the ultrasonic transducer 10 may be of any conventional design adapted for installation at the bottom of a marine vessel. When the transducer is impressed with electric oscillations in the ultrasonic range, i. e., such as 25,000 cycles per second, ultrasonic energy is beamed toward the ocean bottom at the frequency of energization, and upon reflection at low energy level is converted by the transducer into an electric signal capable of amplification and utilization for the purposes described. Because the operating electronic circuits are to be located at a different position on the vessel, energizing ultrasonic impulses and received electric signals are conducted to and from the transducer through a shielded coaxial cable 12.

The transmitting channel of the system includes the ultrasonic oscillator and amplifier circuits 14, preferably of conventional design, periodically pulsed by a suitable modulation system including the sawtooth wave generating circuit or oscillator 16 controlling pulse timing, the differentiating circuit 18 or its equivalent converting the sharp transient trailing ends of the sawtooth waves into sharp or peaked trigger impulses, the modulating-pulse generating circuit 20 triggered at the sawtooth wave frequency by the output of the differentiating circuit 18, and the buffer amplifier circuit 22 directly modulating the ultrasonic oscillator with the amplified pulses. Although other pulse-timing and generating circuits than those mentioned may be employed, I prefer a sawtooth type pulse-timing circuit, because the wave-form produced by it is adapted directly for application to the receiving amplifier circuit as a cyclic automatic volume control, as will be later described more fully. The wave-forms appearing at successive points in the transmitter channel are indicated in the figure, the symbol T₁ designating the start of each transmitted pulse. Circuits included in the blocks 14 and 22 are so conventional as to require no particular description or further illustration. Those represented by blocks 16, 18 and 20 may be conventional in themselves but are nevertheless schematically illustrated in other figures for purposes of the description.

The sawtooth-wave timing circuit 16 is made adjustable to control pulse frequency, and the triggered pulse generating circuit 20 is adjustable to control pulse length. I prefer to employ longer pulses (15 milliseconds) at the 200 fathom range and shorter pulses at the lesser ranges, such as 10 milliseconds at 100 fathoms and 2.5 milliseconds at 20 fathoms. By varying pulse length with range setting in this manner I am better enabled to obtain a maximum ratio of signal-to-noise in the system by use of adjustable filter circuits in the receiving channel to filter out the random noise but not the signal.

The faint electric signals produced in the transducer by the received echoes are amplified in circuits 28, and at resulting greater amplitude are applied to the circuits 30 comprising a signal detector and noise filter circuits. The detected signal impulses are then applied to the pulse amplifier and reshaper circuit 32 which increases their amplitude and restores a sharp or steep leading edge to the pulses partially removed by the process of detection and noise filtering. Such sharp leading edge of the detected pulse is further accentuated in point of time by the differentiating circuit 34 connected to trigger "off" the scale-of-two square wave generating circuit 26.

Modulating pulses generated by circuit 20 are likewise passed through a differentiating or peaking circuit 24 which converts the leading transient edges of each pulse to a sharp impulse of short duration. In this case the resulting sharp impulse is utilized to trigger "on" the square wave generating circuit. The scale-of-two circuit is sometimes referred to as a "flip-flop" circuit. Such a circuit is characterised by its initiation into one static state of operation by application of a first impulse to a control point, and of termination or return to its original state of operation by application to the same or a different control point in the circuit of a second impulse. The circuit is employed in the present application to generate a voltage wave or pulse having steep leading and trailing edges coincident with the first and second applied pulses. Preferably the wave generated is of square or rectangular form, initiated with the transmitted pulse and terminated with the echo, each pulse cycle. The duration of this square wave therefore precisely equals the time of travel of ultrasonic energy from the vessel to and from the ocean bottom and constitutes a measure of ocean depth. The manner of utilization of this square wave to measure and indicate depth is the subject of a later portion of this description.

It will be evident that echo signals are much stronger in shallow water than in deep water because of the divergence or spread of the transmitted ultrasonic beam, and thereby the reduced sound intensity impinging a unit area of the ocean bottom at greater depths, and also because of the divergence of the reflections. Ordinarily, therefore, the signals from shallows are much stronger than required to operate the sensitive electronic receiving circuits, while those from the greater depths may be so faint as to require maximum receiving sensitivity. It will then be immediately evident that a receiver which equally amplifies echo signals from all depths will tax the capacity of any measuring circuits to respond similarly to the signals which occur at the widely divergent intensities, a condition which is naturally undesirable. Moreover, when listening to the signal sounds it will be more difficult to recognize the identifying signal characteristics if this intensity variation is great. The problem is overcome in simple, effective manner by directly utilizing the sawtooth voltage waves already available from the sawtooth pulse timing circuit 16 and applying such waves as cyclic automatic volume control voltage to the receiving amplifier circuits 28, as indicated in Figure 1. Accordingly, the applied progressively rising sawtooth voltage occurring during each pulse cycle, commencing immediately with the transmission of a pulse and ending with the transmission of the succeeding pulse, progressively raises the gain of the receiver during that interval so that signals in shallow water are amplified less than signals in deep water, generally proportionately. Consequently, no manual control is necessary to adjust detected signal intensity throughout the full operating range of the apparatus, and even if sawtooth frequency is changed with range adjustment, the control is unchanged.

Another problem encountered results from the pulses of high intensity ultrasonic oscillations from the oscillator 14 entering the receiving circuits 28 over the same circuit conductor 36 as the faint received echo signals from the transducer, tending to overload the amplifier circuits. A simple addition to these circuits as described overcomes the difficulty with vacuum tube overload, but there remains the more serious problem of the transmitted pulse, at substantial intensity, passing the circuit stages 30, 32 and 34 and reaching the scale-of-two circuit 26. If allowed to reach the circuit 26 this pulse would arrive at an appreciable, though slight, time after the circuit is triggered "on" by the differentiating circuit 24, because of the inherent delay encountered in the receiver channel, and would tend to trigger "off" the circuit 26 at the wrong time, before reception of the echo, a condition obviously unfavorable. To completely avoid any such possibility I prefer to eliminate the transmitted pulse from the receiver channel at the stage of amplifier 32, or beyond, by deriving a blanking pulse coexistent with or overlapping all portions of the transmitted pulse in the receiver, and applying it as a blocking bias to such amplifier. As indicated by the wave form shown in the figure, the transmitted pulse occurring at time $T_1$ and an echo signal at time $T_2$ arbitrarily chosen are both allowed to pass detector 30, however.

Following application of each blanking pulse, it is desirable to allow immediate recovery of circuit sensitivity. A D. C. restorer circuit 40 interposed between the detector amplifier circuit 38 and amplifier 32 performs this function, as later described.

Having thus far generally described the transmitting and receiving circuits, by which the scale-of-two square wave circuit is "turned on and off," it is now timely to consider the manner of utilizing the resulting square waves, or more correctly, their duration, to measure and indicate ocean depth. After passing through a buffer amplifier circuit 42, the square wave from circuit 26 is applied to a linear sawtooth generating circuit 44. The latter produces a linearly rising voltage commencing at time $T_1$ and terminating at time $T_2$ when the echo is received. Since this rise in voltage is linear the resulting peak amplitudes of the sawtooth voltage waves from circuit 44 become directly proportional to ocean depth, and are detected by a peak voltage detector circuit 46 to produce a steady output voltage which can be read on a galvanometer or other indicator. However, instead of applying the output of peak detector 46 directly to a galvanometer, which would impair the detecting characteristic of the circuit 46 by providing a low impedance discharge path for the storage condenser of the peak detector, this steady voltage is applied first to a vacuum tube volt meter circuit 48 which in turn operates indicating meters 50. A continuous depth indication is thereby produced automatically, accurately and in simple manner, and any number of galvanometers or other indicators may be provided at convenient points throughout the vessel without appreciably adding to the cost.

A particular feature of the lapsed-time measuring and indication circuits, later described in full detail, comprises the triggered voltage equalizing circuit 52 which cooperates with the peak voltage detector 46 to enable the latter to respond sensitively to changes in ocean depth no matter how rapid or in what sense they may occur. The voltage equalizing circuit is essentially a one-way switch, triggered or initiated into operation momentarily at time $T_2$, at the end of each sawtooth wave from circuit 44, by a sharp impulse from the differentiating circuit 54 which peaks the transient trailing end of the square wave produced by circuit 26. In a sense, this circuit "compares" at time $T_2$ the instantaneous peak amplitude of the sawtooth voltage with the existing voltage of the charge stored by the condenser in the peak voltage detector circuit 46. It will be evident that the latter is capable of gaining a higher voltage simply by the process of conduction of its detector means, adding charge to the condenser when ocean depth increases and the sawtooth wave peaks rise accordingly above their former value and the steady condenser voltage of the detector circuit. It is likewise important that the condenser retain its charge between sawtooth peaks if its voltage is to be sufficiently steady to prevent flicker of the indicator meters 50. The difficulty, therefore, lay in the condenser being enabled to lose its charge sufficiently rapidly to maintain its voltage accurately representative of depth should the ocean depth suddenly decrease. As will be explained, the voltage equalizing circuit 52, which "compares" voltages, as mentioned, overcomes this difficulty by removing excess charge from the condenser, if necessary, each pulse cycle to prevent discharge of the condenser lagging behind a drop in sawtooth wave peaks. The arrangement thereby permits desirably the use of a peak detector circuit with a high time constant or filter-factor, capable of producing a steady, accurate meter deflection.

Still another feature of the system, as generally illustrated in the block diagram, resides in the provision of a beat frequency oscillator circuit 56 tuned to a frequency near that of the ultrasonic oscillator 14 to produce an audible beat note when mixed in the detector 30 with the received echo signal to enable listening to the signals received. The resulting pulsating output signals from the detector 30 are amplified in the audio amplifier circuit 58 for application to a loud speaker 60 or headphones. From the nature of the audible signal tones thus produced the operator is enabled to recognize the presence of schools of fish in the water or the relative softness of the ocean bottom. The recurring sounds produced from the echo signals are more staccato or sharp when the reflecting ocean bottom is hard, and become slurred or legato with a soft ocean bottom. This enables identifying favorite fishing grounds, for example. The presence of a school of fish is heard as a periodic rushing sound of a duration determined by the thickness of the school in depth. As previously mentioned, pulse repetition rate is set at approximately 50 cycles per minute when the apparatus is used for listening purposes. At this frequency it is also readily possible to listen for the lapsed time interval preceding return of ocean-bottom echoes at the greater depths up to 400 fathoms in the described case, when it may be that the automatic depth measuring or indicator circuits of a particular system are not designed or connected up for operation at such depths.

In the remaining figures and in the following more detailed description of novel portions of the circuit and associated portions, it will be convenient to refer to a number of switching positions, such as four, of the depth finder apparatus, the first three corresponding to the arbitrarily chosen three operating ranges of 20 fathoms, 100 fathoms and 200 fathoms, respectively, and to the corresponding increasing pulse widths, as previously mentioned, and the fourth position corresponding to the listening or audible output setting of the apparatus when pulse repetition rate is set at 50 cycles per minute to receive echoes to 400 fathoms. In practice all adjustable portions of the circuit may be set simultaneously as by rotating a single switch rotor carrying multiple sets of contacts, or separately by operating individual switches. In the schematic circuit diagrams corresponding numbers 1 to 4 are given the illustrated switch contacts.

A convenient and simple sawtooth wave generating circuit for use as an automatic volume control for the receiver amplifiers (Figure 2), and for timing the operation of the triggered pulse generating circuits (Figure 4) appears in Figure 4. In its illustrated form, the circuit comprises a simple neon tube relaxation oscillator, including the neon tube 62, the time-constant determining circuit made up of the storage condenser 64 and charging resistor 66, and the resistor 68 connected in series with the tube 62. The circuit also includes an alternately included storage condenser 70 switched in parallel with the condenser 64 of the control switch to decrease the normal oscillation frequency of 100 cycles per minute to 50 cycles per minute, resistor 68 and the supply voltage being properly chosen to attain this result. Resistor 68 is utilized to prevent excessive discharge current in tube 62 during discharge of the storage condensers. Resistors 66 and 68, in series, offer sufficient resistance to prevent sustained ionizing current flowing in gas tube 62 normally from the voltage source. The sawtooth wave produced is applied to the receiver amplifier through a D. C. blocking condenser 72 and resistor 74, and to the delayed multivibrator type pulse generating circuit 20 (tubes 82 and 84, Figure 4) through the series resistor 76 and coupling condenser 78, as shown.

The condenser 78 and the grid leak resistor 80, and alternatively included, selectable, parallel resistors 80' and 80'' (switch positions 1 and 2, respectively) constitute a differentiating circuit which converts the transient terminal portions of the recurring sawtooth waves into short negative impulses capable of triggering "off" the amplifier tube 82 of the pulse generating circuit to initiate the modulating pulse. For this purpose condenser 78 is chosen small (perhaps 500 micro-microfarads), and the resistors 80, 80' and 80'' are large (perhaps 6 megohms, .5 megohms, and 10 megohms, respectively) the particular size of the resistors, however, being determined primarily by the desired length of pulse to be produced by the delayed multivibrator circuit in the various switch positions. The pulse-generating, delayed multivibrator circuit, including amplifier tubes 82 and 84, is of conventional design, capable of initiation by application of the trigger pulse to the control grid of the normally conducting tube 82. When thus momentarily cut off by this trigger pulse, tube 82 applies a positive potential to the control grid of tube 84 rendering the latter conductive. Tube 82 is then rendered further non-conductive, and the condition persists until, in the usual manner, a predetermined time later, fixed by the capacity of the condenser 86 and the particular resistance switched in the grid circuit of tube 82, the grid of tube 82 again becomes positive and the tube conducts. In the meantime the resulting negative output pulse, appearing at the anode of tube 84, initiates the scale-of-two pulse generating circuit (Figure 6), and also acts to overcome the negative bias suppressing oscillations in the ultrasonic oscillator, to render the latter operative and energize the transducer.

In Figure 2 are shown representative receiving amplifier stages of the preferred, double-tuned type, of which there may be any number in the receiver depending upon the amount of receiver gain desired. The received signal applied to the amplifier input terminal 88 passes through the coupling condenser 90 to the control grid of the first amplifier tube 92 having a tuned circuit 94 in its anode lead. By inductive coupling the tuned circuit 96 in the grid lead of the succeeding amplifier tube 98 is energized at amplified level for further amplification in the latter tube and coupling from the latter's tuned plate circuit 100 to the tuned circuit 102 in the grid lead of a succeeding amplifier tube (not shown). Double-tuned amplifiers of this type are generally conventional. However, certain simple additions have been made in the circuit and in its mode of operation to improve its utility for ultrasonic depth-finding according to the present invention. The first improvement includes the addition in the grid-cathode circuit of the tube 98, for example, of the parallel R.-C. circuit, including the resistor 106 and the by-passing condenser 104 connected between ground and that side of the tuned circuit 96 which is remote from the tube's control grid. By choosing this resistor and condenser of proper sizes (such as 500 micro-microfarads and 1 megohm, respectively) excessive plate current in tube 98 is prevented when the tube is overdriven, as during the transmitted pulse entering the receiver, by the process of grid-leak detection or self-biasing of the tube. Thus, following an exceedingly short initial surge of current through tube 98, during which condenser 104 is charged, plate current immediately assumes an allowable value compatible with the tube's normal capacity, as established by the negative bias developed by grid current flow in resistor 106. The weaker signal pulses do not cause grid current to flow, and no negative bias results during their application to the tube, which thus amplifies them fully. The condenser 104 is an ultrasonic by-pass, effectively connecting the tuned circuit 96 and the tube's cathode directly together for ultrasonic frequency currents, and thereby prevents any reduction in useful gain of the amplifier stage by the presence of the resistor 106.

Another feature relating to the receiver amplifier circuit is the application to an amplifier control element therein of the sawtooth automatic volume control voltage from the circuit 16 illustrated in Figure 4. This voltage enters at terminal 108 and is applied to the grid of tube 98, for example, to control the tube's gain through the effect of sawtooth bias. The connection is made at the cathode rather than the grid side of tuned circuit 96, and resistor 74 (Figure 4) is inserted in series with the lead-in conductor connected to terminal 108, in order to isolate the sawtooth wave generating circuit 16 from ultrasonic currents which might cause undesired discharge in neon tube 62 (Figure 4). The cathode of tube 98 is returned to a source of low positive voltage which is made adjustable to establish the desired operating point on the tube's characteristic.

Figure 3 illustrates the signal detector and noise filter circuits 30, the beat frequency oscillator 56, the pulse amplifier reshaper 32 and the audio amplifier 58. The recurring pulses, both transmitted and received, passing through the receiving amplifier stages, are applied to the tuned circuit 110 in the grid lead of the amplifying grid-leak detector tube 112. This detector circuit includes the grid leak resistor 114, the D. C. blocking condenser 116 connected between the grid and the tuned circuit 110, the anode resistor 118 and the small (perhaps 500 micromicrofarads) anode by-pass filter condenser 120 which filters out the ultrasonic oscillations for detection purposes.

Through coupling condenser 122 the detected or rectified signal pulses pass to an integrating type noise filter circuit including the series resistor 124, the shunting condenser 126 and the alternatively selected parallel condensers 126' and 126" connected between grid and cathode of the pulse amplifier-reshaper tube 128. The noise filter circuit 124—126, etc., filters out most of the interference "noise" entering or generated in the receiver channel, but at the same time it necessarily somewhat distorts the received and detected signals by somewhat rounding off the pulse corners or edges. The reason the distortion is not great, or that the signal pulses are not also eliminated by the filter circuits, is that they are of substantially longer duration than most of the noise impulses which appear in the circuit. Changing the setting of the switch successively through positions 1, 2 and 3, respectively, increases the capacity of the filter (condenser 126" being larger than 126') and enhances the filtering effect. This is done at the higher range settings wherein noise tends to be more prominent and obscure the signals. However, no undesired proportionately greater distortion of the signal occurs from such adjustments, since pulse length is preferably simultaneously also increased to preserve a sufficiently high or maximum signal-to-noise ratio at different range settings.

Any slight rounding or deformation of the pulse by the noise filter circuit is substantially eliminated by passing the signal through the pulse amplifier-reshaper tube 128 having a high amplification factor. The effect is to steepen the leading edge or front of the signal pulses by dint of amplification, and flatten the pulse top because of the anode resistor 130 of the tube 128 being sufficiently large that the tube saturates before the applied signal reaches full amplitude. From the anode of tube 128 the reshaped recurring signal pulses are differentiated and applied to trigger "off" the scale-of-two square wave circuit 26, periodically.

The transmitted pulses detected in the receiver channel are blocked from amplification in tube 128 by application of the negative blanking pulse to the terminal 132 and hence to the control grid of the tube at the same time the detected transmitted pulse also reaches this point in the circuit through the receiver channel. The former is of greater amplitude and of opposite (negative) polarity, hence renders tube 128 nonconductive at that time. Any negative charge which then accumulates on condensers 126, 126' . . . , producing negative bias on the grid of the tube, is lost quickly by discharge through resistor 124, enabling rapid recovery of full amplifier sensitivity to received signals.

When the switches are turned to the listening setting, position 4, the pulse repetition rate of the relaxation oscillator is decreased from 100 cycles per minute to 50 cycles per minute. At the same time, the beat frequency oscillator 56 (detailed in Figure 3) is set into operation at a frequency which appropriately differs from the ultrasonic frequency to produce an audible beat note in the output of the signal detector tube 112. If the ultrasonic frequency is 25,000 cycles per second, a signal tone of 1000 cycles per second is produced by tuning the beat frequency oscillator to 24,000 or 26,000 cycles per second. The beat frequency oscillator, including tube 134, is a conventional type of circuit and needs no description. It is tuned by switching capacitance in and out of the circuit. Oscillator output is coupled to the control grid of the detector amplifier 112, either directly or conveniently by the stray capacitance $C_s$ between the circuit sections, indicated by dotted lines in the figure. The resulting audible signals produced in the loudspeaker or headphones assume a tonal characteristic or "chirping" sound which replaces what would otherwise be a dull thudding noise having no features distinguishable to the ear, and it is possible by listening to these sounds to make the determinations suggested previously. Since the blanking pulse applied to terminal 132 (Figure 3) must pass through the voltage-dropping resistor 124 before reaching audio amplifier 136 it does not blot out the transmitted signal passing detector tube 112, and this is heard along with the received echo signals, enabling gauging depth by listening for the lapsed time interval.

Figure 7:
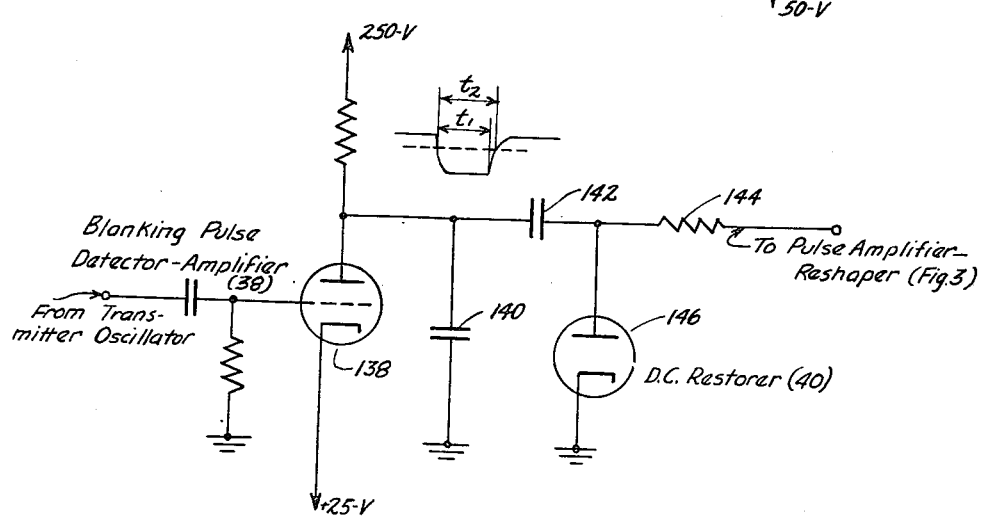

Figure 7 illustrates the circuit for deriving the blanking pulse for application to the grid of tube 128. The ultrasonic transmitted oscillations from transmitting oscillator 14 are passed through a detector-amplifier tube 138, operable by rectification to produce a negative blanking pulse. Because of circuit delay in the double-tuned receiver amplifier stages, the transmitted pulse passing the receiving channel will not precisely coincide in point of time with the original pulse detected by tube 138, the latter somewhat preceding the former. This tends to cause incomplete blanking of the intruding transmitted pulse and would allow its trailing end to reach the scale-of-two circuit 26. To overcome this difficulty I employ a blanking-pulse lengthening condenser 140, connected from anode to ground across tube 138. The operation is as follows: Since only part of the full amplitude or value of the blanking pulse is necessary to effect full blanking of the amplifier tube 128 (dotted line, Figure 7) the base of the diagrammed pulse being broadened by the gradual slope imparted to the pulse edges by the condenser, the effect is to lengthen the blanking period from a length $t_1$ to a length $t_2$. The effectively protracted blanking pulse then overlaps the entire transmitted pulse which it is to blank.

The blanking pulse passes through a D. C. blocking condenser 142 and a series resistor 144 to the grid of amplifier tube 128. A diode tube 146 is connected from between this condenser and resistor to ground potential, discharging the coupling condenser 142 immediately following the blanking pulse. By this means the quiescent voltage at the grid of tube 128 is restored immediately following the blanking pulse.

Figure 6:
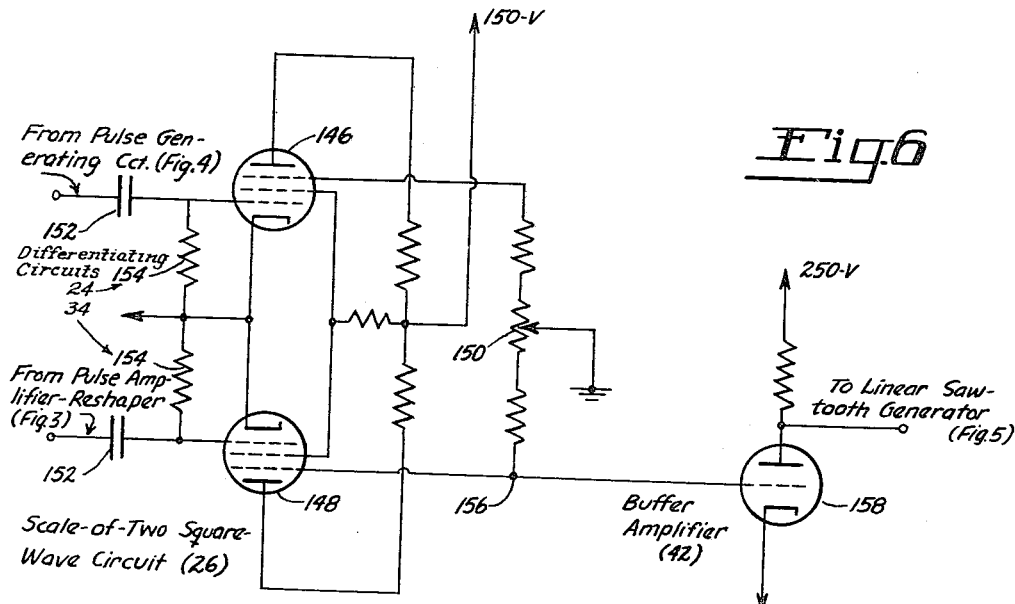

The scale-of-two square wave generating circuit is shown in Figure 6 and comprises one of several known alternative circuits of a type adapted to be switched between alternative steady operating states, to produce waves of determinable length resulting from successive trigger pulses applied recurringly thereto. The illustrated circuit is of the modified Eccles-Jordan type, comprising amplifier tubes 146 and 148 whose suppressor grid circuits are balanced by a variable center-tap resistor 150 and whose input or control grid circuits include the differentiating condenser 152 and resistor 154 combinations shown, for sharp triggering action. A negative impulse, coinciding with the transmitted pulse, applied to whichever of the tubes 146, 148 is then conducting, switches the circuit from one state of conduction to another, thereby reversing the roles of the tubes in that respect, and initiating the positive square wave pulse at circuit point 156. The later application of the received signal to another control grid terminates the square wave, which then necessarily becomes of a duration equal to the time of travel of the ultrasonic energy from the transducer to and from the ocean bottom. The positive square wave is inverted in polarity by the buffer amplifier 158 for application to the linear sawtooth wave generator (Figure 5).

As already explained, the function of the linear sawtooth wave generator is to produce a linearly varying voltage during application of the square wave from the circuit 26, the sawtooth peak amplitude corresponding accurately to instantaneous ocean depth. This circuit includes the storage condenser 160, normally in a state of full discharge through the positively biased amplifier switch tube 162. Upon application of the negative square wave from amplifier tube 158 to the control grid of switch tube 162, overcoming the positive bias and rendering the tube nonconductive, condenser 160 commences to charge linearly from a source of positive voltage through a selected one of the series sawtooth-slope determining resistors 164, 164' and 164". The condenser continues to charge for the duration of the applied negative square wave, after which it is immediately discharged for another cycle.

During charging of condenser 160, the condenser 166 in the cathode circuit of the diode rectifier 168 likewise charges through the diode; however, at the end of the sawtooth wave the latter condenser retains its charge, corresponding to peak sawtooth amplitude, because of the inability of the diode to conduct in the reverse direction. This diode and condenser 166 thereby form a peak voltage detector circuit 46 (Figure 1) which produces a steady or direct voltage following the sawtooth peaks, applied to the control grid of the vacuum tube amplifier 170 in the vacuum tube voltmeter circuit (48) to control deflection of the depth meter 50 linearly as a function of condenser voltage.

Because of the high impedance of the grid circuit of amplifier tube 170 and the high inverse impedance of the diode rectifier 168, condenser 166 retains substantially its entire charge throughout the period between succeeding sawtooth wave peaks. In fact, if the peak sawtooth voltage does not change, corresponding to a constant ocean depth, over a period of time, only minute charging impulses flow to condenser 166 as necessary to maintain its peak voltage constant by compensating for any slight residual leakage in the condenser or connected components. Also, if the ocean depth increases appreciably, the peak sawtooth voltage correspondingly rising, a greater amount of charge flows to condenser 166 through the diode 168, so that the meter 50 sensitively follows increasing changes in ocean depth without any difficulty. However, because of the high circuit impedance to condenser discharge, a sudden decrease in ocean depth would not be felt by the meter for a considerable period of time unless some provision were made to discharge condenser 166 until its stored voltage corresponded to the reduced peak amplitude of the sawtooth wave. A voltage equalizing circuit accomplishes this result by effectively "comparing" the voltage of condenser 166 with the peak amplitude of the sawtooth wave at the peak periods, and then removing any surplus charge from the condenser as may be necessary to produce equality.

The equalizing circuit includes the vacuum tube amplifier 172 having its anode connected to the cathode of diode 168 and its cathode to the anode of the diode. The tube 172 acts as a vacuum tube switch normally biased negatively beyond cut-off so that it then removes no charge from condenser 166. However, at the end of the square wave applied to switch tube 162, corresponding to the end of the sawtooth wave, a sharp positive impulse, derived from the end of the square wave by the differentiating condenser 174 and resistor 176 combination, is applied to the control grid of tube 172, which renders it momentarily conductive. Current then flows in tube 172, but only if the voltage of condenser 166 exceeds the peak voltage of the sawtooth wave, thereby substantially equalizing the former with the latter, as desired. A circuit of the foregoing type, alone, or combined with a sawtooth circuit and a peak voltage detector, is well adapted for the measurement of time intervals, or the like, in other types of systems as well as the present one.

The vacuum tube voltmeter circuit follows a more or less conventional pattern, the meter 50 being connected in the cathode side of the amplifier tube 170 and in series with selectable resistors 178, 178' and 178". The different resistors are switched into the circuit to provide the different range scale readings on meter 50 corresponding to the different slopes of the linear sawtooth wave generated in the preceding circuit (46) at the different range settings. These resistors 178 etc., are adjustable to compensate for any discrepancies in the actual resistance values of resistors 164, etc., from their intended precise values. A zero-set circuit including voltage dividing variable resistors 180, 180' and 180" connected in circuit with the meter 50 enables adjusting the meter 50 for zero reading at zero range. A biased diode 181 prevents excessive voltages at the grid of tube 170 as a protection to the meters 50 against overload currents.

It should be understood that the circuit details thus described are not necessarily exclusive of other possible circuit arrangements, and that many of the details are omitted because of their convenionality and to shorten the description. For example, it will be evident that the system may be provided with various check points for testing and calibration purposes, and that suitable power supply means are also required. In actual practice, for example, the beat frequency oscillator 56 is converted to a high operating frequency (as seen in Figure 3) by moving the switch from position 4 to any other position, removing the audible beat note from the detected signals. The beat frequency oscillator output is then rectified to produce a negative bias for various parts of the circuit. Also, it is frequently desirable to utilize a cathode ray tube indicator to display the echo signals visibly.

These and other details are comparatively unimportant to understanding the principles of the invention and so were generally omitted from the description.

I claim as my invention:

1. Means for continuously detecting peak amplitudes of a recurring voltage wave, comprising detector means including rectifier means and charge storing means connected operatively in series, circuit means for impressing upon said detector means a recurring voltage wave to be detected, whereby said storing means charges to the wave voltage peaks, vacuum tube means connected between said circuit means and said storing means and operable when conductive to remove charge from said storing means if the voltage of said storing means then exceeds the voltage of said wave, and means operable synchronously with the recurring voltage wave to render said vacuum tube momentarily conductive only in the peak periods of said recurring wave, thereby to enable the voltage of said charge storing means to follow sensitively decreasing wave peaks as well as increasing wave peaks normally rectified through said rectifier means.

2. Means for continuously detecting peak amplitudes of a recurring voltage wave, comprising rectifier means and storage condenser means connected operatively in series and adapted to be impressed with the wave to be detected, a vacuum tube amplifier having its anode connected to the cathode of said rectifier means and its cathode connected to the anode of said rectifier means, said amplifier being operable to conduct when inverse voltage develops across said rectifier means, and means operable synchronously with the recurring voltage wave to render said vacuum tube amplifier conductive momentarily only in the peak periods of the recurring wave to remove excess charge on said condenser if its voltage effectively exceeds that of the wave peaks, whereby the condenser voltage sensitively follows both rising and falling peaks of the detected wave.

3. Electronic means for continuously measuring time interval between two sequentially recurring circuit transients, comprising linear sawtooth wave generating means adapted to be initiated by occurrence of the first transient and to be terminated by occurrence of the second transient, cyclically, peak sawtooth voltage detecting means comprising a rectifier and condenser connected in series and adapted to be impressed with said sawtooth wave to produce a charge on said condenser proportional to peak voltage of the sawtooth wave, increases in said wave peaks effecting increased charge on said condenser through said rectifier, and vacuum tube means connected between said saw-tooth wave generating means and said condenser and operable when conductive to remove charge from said condenser if its charge voltage substantially exceeds peak sawtooth wave voltage, means operable synchronously with said wave to render said vacuum tube means conductive momentarily only in the peak periods of said wave, thereby enabling condenser voltage to sensitively follow both rising and falling wave peaks, and means to indicate condenser voltage continuously.

4. For a distance determining electronic means of the pulsed energy transmission and echo reception type time interval measuring means comprising linear sawtooth wave generating means operable for initiation synchronously with pulse transmission and for termination by pulse reception, cyclically, peak sawtooth voltage detecting means comprising a rectifier and condenser connected in series and impressed with said sawtooth wave to produce a charge on said condenser proportional to peak voltage of the sawtooth wave, increases in said wave peak effecting increased charge on said condenser through said rectifier, and vacuum tube means connected between said saw-tooth wave generating means and said condenser and operable when conductive to remove charge from said condenser if its charge voltage substantially exceeds peak sawtooth wave voltage, means operable synchronously with said wave generating means to render said vacuum tube means conductive momentarily only in the peak periods of said wave, thereby enabling condenser voltage to sensitively follow both rising and falling wave peaks, and means to indicate condenser voltage continuously, and thereby the distance to be determined.

5. For an electronically controlled depth finding system adapted to transmit ultrasonic impulses toward the ocean bottom, and to receive and amplify the echo impulses, time interval measuring means comprising a scale-of-two circuit adapted to be triggered "on" synchronously with transmission of impulses and to be triggered "off" by reception of echo impulses in such a system, linear saw-tooth wave generating means operatively connected to said scale-of-two circuit and actuated thereby during the "on" periods of said circuit to produce a linearly varying saw-tooth wave voltage during such latter periods, linear peak detector means adapted to be impressed with said wave voltage and having a storage element carrying a steady voltage proportional to saw-tooth peaks, switch means interconnecting said storage element and wave generating means and operable when actuated to equalize storage element voltage with saw-tooth wave voltage, and means controlled by said scale-of-two circuit and recurringly actuating said switch means thereby momentarily only at the terminations of said "on" periods, the voltage of said peak detector storage element thereby being a measure of depth.

6. The combination defined in claim 5, wherein the switch actuating means comprises a differentiating circuit producing a switch actuating impulse responsively to the transient of the scale-of-two circuit at the termination of each "on" period thereof.

7. Means for measuring time interval between two sequentially recurring impulses, comprising square wave generating means recurringly initiated by one of said impulses and terminated by the other thereof, linear saw-tooth wave generating means controlled by said square wave generating means to produce a saw-tooth wave linear voltage variation continuing between such initiation and termination, charge storing means, charging circuit means operatively connecting said linear saw-tooth wave generating means to said charge storing means for flow of charge therein unidirectionally to said charge storing means, vacuum tube switch means interconnecting said charge storing means and said saw-tooth wave generating means supplementally to said charging circuit means, and normally biased for isolating said two means but operable when actuated by a voltage impulse to pass charge from said charge storing means and thereby equalize voltage of said storing means to saw-tooth wave voltage, and voltage impulse generating means operated simultaneously with termination of said square wave generating means to actuate said switch means momentarily and thereby automatically equalize voltage of said storing means with saw-tooth wave peak voltage.

WAYNE M. ROSS.

REFERENCES CITED

The following references are of record in the file of this patent:

UNITED STATES PATENTS

| Number | Name | Date |
|---|---|---|
| 2,167,492 | Sproule | July 25, 1939 |
| 2,346,093 | Tolson | Apr. 4, 1944 |
| 2,403,557 | Sanders | July 9, 1946 |
| 2,446,937 | Lorance | Aug. 10, 1948 |
| 2,446,960 | Seebinger | Aug. 10, 1948 |
| 2,460,316 | Trent et al. | Feb. 1, 1949 |
| 2,473,974 | Schuck | June 21, 1949 |
| 2,502,938 | Fryklund et al. | Apr. 4, 1950 |
| 2,519,898 | Gardner | Aug. 22, 1950 |

FOREIGN PATENTS

| Number | Country | Date |
|---|---|---|
| 469,417 | Great Britain | July 26, 1937 |